(12) United States Patent
Scott et al.

(10) Patent No.: US 9,526,979 B2
(45) Date of Patent: Dec. 27, 2016

(54) STORING STATE FOR PHYSICAL MODULAR TOYS

(71) Applicant: Microsoft Corporation, Redmond, WA (US)

(72) Inventors: James William Scott, Cambridge (GB); Nicolas Villar, Cambridge (GB); Haiyan Zhang, London (GB); Greg Saul, London (GB); Alexandra Keeley Bunting, London (GB); Lee Jason Schuneman, London (GB); Philip Robert Harrison, Chalfont St Giles (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 14/204,929

(22) Filed: Mar. 11, 2014

(65) Prior Publication Data

US 2015/0258459 A1    Sep. 17, 2015

(51) Int. Cl.
*A63F 9/24* (2006.01)
*A63F 13/00* (2014.01)

(52) U.S. Cl.
CPC .................... *A63F 13/00* (2013.01)

(58) Field of Classification Search
CPC ........... A63F 13/08; A63F 13/95; A63F 13/00
See application file for complete search history.

(56) References Cited

U.S. PATENT DOCUMENTS 6,149,490 A    11/2000   Hampton et al.
6,290,565 B1   9/2001   Galyean, III et al.
(Continued)

FOREIGN PATENT DOCUMENTS

WO    0112285 A1    2/2001
WO    0169799 A2    9/2001
(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.
(Continued)

*Primary Examiner* — Steve Rowland
(74) *Attorney, Agent, or Firm* — Tom Wong; Micky Minhas; Zete Law, P.L.L.C.

(57) ABSTRACT

A modular assembly system is described in which each module comprises a storage element which stores an identifier for the module and data relating to the module. At least some of the module data is variable and is updated based on user interaction with an interactive software experience (e.g. state data). Each module also comprises one or more connectors for connecting to other modules to form a coherent physical whole object. In an embodiment, the system further comprises the interactive software experience which provides user objectives which can only be satisfied by the user interacting with the object or with modules that form the object. At least one of the modules in the object comprises a communication module which passes identifiers and module data to the interactive software experience and receives updated module data from the interactive software experience for storing in one of the modules in the object.

20 Claims, 5 Drawing Sheets

(56) References Cited

U.S. PATENT DOCUMENTS

| | | |
|---|---|---|
| 6,454,624 B1 | 9/2002 | Duff et al. |
| 6,575,802 B2 | 6/2003 | Yim et al. |
| 6,682,392 B2 | 1/2004 | Chan |
| 6,773,322 B2 | 8/2004 | Gabai et al. |
| 6,773,344 B1 | 8/2004 | Gabai et al. |
| 6,954,659 B2 | 10/2005 | Tushinsky et al. |
| 7,154,363 B2 | 12/2006 | Hunts |
| 7,641,476 B2 | 1/2010 | Didur et al. |
| 7,695,338 B2 | 4/2010 | Dooley et al. |
| 8,079,846 B1 | 12/2011 | Cookson |
| 8,087,939 B2 | 1/2012 | Rohrbach et al. |
| 8,257,157 B2 | 9/2012 | Polchin |
| 8,317,566 B2 | 11/2012 | Ganz |
| 8,475,275 B2 | 7/2013 | Weston et al. |
| 8,548,819 B2 | 10/2013 | Chan et al. |
| 2001/0049249 A1* | 12/2001 | Tachau ............... A63H 17/34 446/397 |
| 2005/0132290 A1 | 6/2005 | Buchner et al. |
| 2007/0072680 A1* | 3/2007 | Ikeda .................. A63F 13/06 463/43 |
| 2007/0097832 A1 | 5/2007 | Koivisto et al. |
| 2007/0198117 A1 | 8/2007 | Wajihuddin |
| 2009/0081923 A1 | 3/2009 | Dooley et al. |
| 2009/0197658 A1* | 8/2009 | Polchin ............... A63F 13/02 463/9 |
| 2009/0291764 A1 | 11/2009 | Kirkman et al. |
| 2009/0307592 A1 | 12/2009 | Kalanithi et al. |
| 2010/0007528 A1* | 1/2010 | Urata .................. G06F 3/0346 341/20 |
| 2010/0026458 A1* | 2/2010 | Samdahl ............. G07F 17/3225 340/10.1 |
| 2010/0167623 A1 | 7/2010 | Eyzaguirre et al. |
| 2011/0021109 A1 | 1/2011 | Le et al. |
| 2012/0050198 A1 | 3/2012 | Cannon |
| 2012/0122059 A1 | 5/2012 | Schweikardt et al. |
| 2012/0286629 A1 | 11/2012 | Johnson et al. |
| 2013/0109267 A1 | 5/2013 | Schweikardt et al. |
| 2013/0109272 A1 | 5/2013 | Rindlisbacher |
| 2013/0122753 A1 | 5/2013 | Blakborn |
| 2013/0157477 A1* | 6/2013 | McCormack ...... H01R 13/6205 439/39 |
| 2013/0165223 A1 | 6/2013 | Leyland et al. |
| 2013/0196770 A1 | 8/2013 | Barney et al. |
| 2013/0288563 A1 | 10/2013 | Zheng et al. |

FOREIGN PATENT DOCUMENTS

| | | |
|---|---|---|
| WO | 0169829 A2 | 9/2001 |
| WO | 2009037679 A1 | 3/2009 |
| WO | 2012160055 A1 | 11/2012 |

OTHER PUBLICATIONS

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.

Kikin-Gil, Ruth, "BuddyBeads", Published on: Oct. 10, 2006, Available at: http://www.ruthkikin.com/Images/r.kikin-gil_thesis2005.pdf.

Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Labrune, et al., "Telebeads: Social Network Mnemonics for Teenagers", In Proceedings of Conference on Interaction Design and Children, Jun. 7, 2006, 8 pages.

Ahde, et al., "Hello—Bracelets Communicating Nearby Presence of Friends", In Proceedings of the Tenth Anniversary Conference on Participatory Design, Sep. 30, 2008, 3 pages.

Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZle-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.

Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.

Lampe, et al., "Integrating Interactive Learning Experiences into Augmented Toy Environments", In Proceedings of the Pervasive Learning Workshop at the Pervasive Conference, May 2007, 8 pages.

"Seebo Platform", Published on: Jun. 22, 2013, Available at: http://www.seebo.com/.

Raffle, et al., "Topobo: A Constructive Assembly System with Kinetic Memory", In Proceedings of the SIGCHI Conference on Human Factors in Computing Systems, Apr. 24, 2004.

Schmid, et al., "Networking Smart Toys with Wireless ToyBridge and ToyTalk", in IEEE International Conference on Computer Communications, Apr. 10, 2011, 2 pages.

Patrizia, et al., "A Robotic Toy for Children with special needs: From requirements to Design", In IEEE 11th International Conference on Rehabilitation Robotics, Nov. 20, 2013, 6 pages.

Zaino, Jennifer, "JNFC Technology Brings New Life to Games", In Journal of RFID, Oct. 1, 2012, 10 pages.

"The NEX band", Jan. 3, 2014, Available at: http://www.mightycast.com.

* cited by examiner

STORING STATE FOR PHYSICAL MODULAR TOYS

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known apparatus for interacting with interactive software experiences, such as games.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A modular assembly system is described in which each module comprises a storage element which stores an identifier for the module and data relating to the module. At least some of the module data is variable and is updated based on user interaction with an interactive software experience (e.g. state data). Each module also comprises one or more connectors for connecting to other modules to form a coherent physical whole object. In an embodiment, the system further comprises the interactive software experience which provides user objectives which can only be satisfied by the user interacting with the object or with modules that form the object. At least one of the modules in the object comprises a communication module which passes identifiers and module data to the interactive software experience and receives updated module data from the interactive software experience for storing in one of the modules in the object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A system is described below which comprises a plurality of hardware modules which are each a sub-component of a coherent physical whole object, such as a toy. The modules may be connected together and re-arranged by users as part of interaction with an interactive software experience (e.g. a game), such that the modules and the coherent physical whole object which they form act as a user input device for the interactive software experience. In various examples, the interactive software experience provides a directed experience in that it presents a user with goals or objectives that require the user to interact with the object in some way (e.g. by rearranging modules or moving modules, by interacting with a sensor on a module, etc.). The interaction may be with the object as a whole or with one or more modules that are part of the object. In some examples, the act of assembly of a plurality of modules by a user into a complete object (e.g. a particular combination and/or arrangement of modules) unlocks or enables the interactive software experience or parts thereof (e.g. particular features, mini-games, levels, etc.).

Once assembled, the coherent physical whole object is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object 108 is moveable freely (e.g. in three dimensions) by a user and is capable of communicating with the interactive software experience while it is in motion. The coherent physical whole object (and/or the modules from which it is formed) may comprise mechanical articulation or movement affordances, e.g. it may have joints such as hinges, or some elements may be mobile compared to other elements, e.g. sliding or rotating with respect to one another.

Each coherent physical whole object comprises a plurality of modules. Each module has one or more connectors to enable it to connect to other modules to form a coherent physical whole object and these connectors pass data and power between modules. Each module also comprises a memory which is arranged to store both an ID for the module and data relating to the module (referred to herein as 'module data'). As is described in more detail below, the module data may comprise game state information, game data itself (i.e. the code for the entire interactive software experience or for a part of it), etc. At least some of the module data is variable and is updated by based on user interaction with interactive software experience (e.g. using a conventional user input device or the object as user input device).

In various examples the coherent physical whole object comprises at least one core module and one or more peripheral modules. A core module comprises additional processing capability compared to a peripheral module and generally a core module acts as a master while the peripheral modules act as slave modules; however a core module may in various examples be configured to act as a slave (e.g. where there is more than one core module). Both core and peripheral modules comprise one or more connectors and a memory which is arranged to store both an ID for the module (which may be a unique ID or an ID shared with other identical looking modules, e.g. an ID for a type of module) and module data for the module.

The modules can, for example, represent parts (e.g. head, body, limbs) of a humanoid/animal/mystical character (e.g. a human, animal or robot), vehicles or parts thereof (e.g. chassis, wheels, roof, etc.), accessories for a vehicle or character (e.g. weapons, clothing, armor, or other objects which the character may wear/carry/hold), tracks (e.g. for a car, train, human, animal or other mobile object), bricks (e.g. as part of a construction set), baseboards or levels (e.g. where the tracks/bricks/baseboards/levels may form part of a playset such as a train set, model village, tower block, dolls house or other construction), parts of an educational toy (e.g. parts of a molecular model, skeleton or body, etc.) or fashion items or parts thereof. Where the interactive software experience is a game, the modules may comprise sub-components of a game piece (which may also be referred to as a toy or modular toy) and that game piece may be a character, vehicle, etc.

Figure 1:
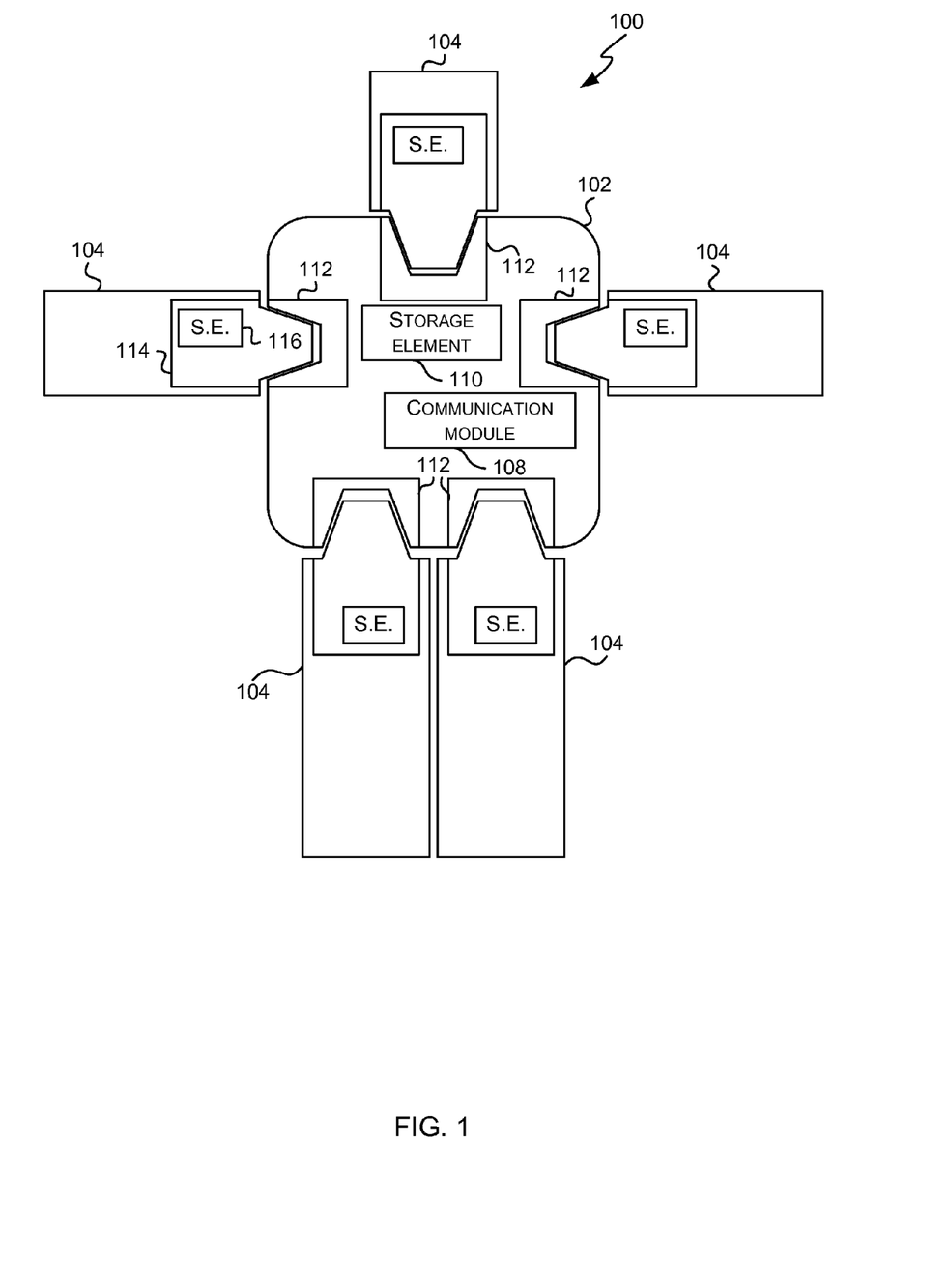
FIG. 1 is a schematic diagram of a coherent physical whole object formed from a plurality of modules.

FIG. 1 is a schematic diagram of a coherent physical whole object 100 formed from a plurality of modules 102, 104. Each module 102, 104 comprises a storage element 110, 116 (e.g. a memory) and one or more connectors 112, 114. The connectors 112, 114 physically attach the modules 102, 104 together and also pass data and power between modules. The storage element 110, 116 which may be integrated within a connector (e.g. as shown in module 104 in FIG. 1) or separate from a connector (e.g. as shown in module 102 in FIG. 1), is arranged to store an ID of the module (which in some examples may be a unique ID for the module or a unique ID for the type of module) and module data. This module data comprises variable data (i.e. data which changes over the life of the module) which is updated by the interactive software experience and may also comprise constant data (i.e. data which does not change over the life of the module).

At least one of the modules (which may be a core module) in the coherent physical whole object 100 comprises a communications module 108 which enables the module 102 to communicate with a computing device running an interactive software experience, such as a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc. Any suitable communication technology may be used, including wireless technologies (e.g. Bluetooth®, Bluetooth® Low Energy, WiFi™ or WiFi™ Direct, Near Field Communication (NFC), 802.15.4, etc.) and wired technologies. The communications module 108 may communicate directly with the computing device running the interactive software experience (e.g. smartphone, tablet computer, games console, etc.) or may communicate via a network (e.g. a home network or the internet) or intermediary device (e.g. a wireless access point) or intermediary server (e.g. cloud server).

The information which is communicated from the coherent physical whole object 100 to the interactive software experience (via the communication module 108) may include the IDs of the modules 102, 104 and some or all of the module data stored in each of the modules which together form the coherent physical whole object 100. In other examples, the ID information may be aggregated by one of the modules (e.g. module 102) such that the raw IDs of each module are not transmitted but other information (e.g. module set information such as "module set A") is communicated from which the interactive software experience can determine which modules together form the coherent physical whole object 100. In various examples, the module data may similarly be aggregated before it is communicated to the interactive software experience. The information which is communicated to the interactive software experience (e.g. the IDs and the module data) may cause a change in the operation of the interactive software experience.

As described above, the interactive software experience provides a directed experience in that it presents a user with goals or objectives that require the user to interact to achieve. Such interaction in a normal game is through existing peripherals like keyboards, mice, controllers, etc. Using the modular objects described, the interactive software experience may also require the user to interact with the object in some way. For example, a user may need to rearrange the modules in order to progress to a new level or achieve a goal within the interactive software experience. In various examples, a user may need to interact with the whole object (e.g. by moving a vehicle around a track) in order to further progress within the interactive software experience. In other examples, the user may be required to: add or remove modules from the coherent whole, e.g. to equip a particular weapon; to swap modules between multiple coherent whole objects (e.g. to transfer an "arm" from one robot to another robot), or to use input capabilities on the object or its constituent modules, e.g. to rotate a module in its socket, or to tap a module equipped with a button, accelerometer or other sensor, etc. In yet more examples, directed play may have more abstract goals requiring the user to formulate tactics or strategies for using the modules. For example, in a battle game, various modules may have different capabilities to attack or defend in certain ways, and the player must try to beat an opponent by swapping in and out modules in a way to maximize the chance of causing damage to the opponent while reducing damage caused to their own game character.

In various examples, one of the modules (e.g. a module 102 which also comprises a communication module 108) may also comprise a processor arranged to collect the IDs of each of the modules connected to form the coherent physical whole 100 and to collect some of all of the module data from each of the modules. The processor may be a microprocessor, controller or any other suitable type of processor for processing computer executable instructions to control the operation of the core module in order to collect data from the connected modules. In various examples, the data may be collected by a core module from each of the connected modules directly (e.g. via a bus which is electrically connected via the connectors or other means, such as using NFC, QR codes or computer vision). In other examples, however, each module may collect information on its neighbors such that the core module aggregates the data provided by its direct neighbor modules.

It will be appreciated that the modules 102, 104 shown in FIG. 1 may comprise additional elements not shown in FIG. 1, such as batteries, sensors, actuators, displays, additional hardware logic, etc. Furthermore, although in FIG. 1 only one of the modules comprises a communication module 108, in other examples, each module may comprise a communication module 108 and each module may communicate its own ID and module data to the interactive software experience. It will further be appreciated that although FIG. 1 shows one module 102 as a robot body and the other modules 104 as the head and limbs, each of the modules can have any physical form factor (e.g. any shape of external housing) which is compatible with the other modules (i.e. each module is shaped such that it can connect to at least one other module, without the outer housing clashing).

As described above, the module data which is stored within each module relates to that particular module (i.e. the module in which the data is stored) and may comprise constant data and/or variable data. Where the data is variable, this may be updated by the interactive software experience with which the module is used and/or by a processor within the module itself or within another module in the coherent physical whole object.

Examples of constant data include, but are not limited to:
Game data, such as:
  a 2D/3D representation of the module which can be used within a graphical user interface (GUI) of the interactive software experience to represent the module (e.g. a 3D model, image and/or texture map) or other data describing the module's physical characteristics (e.g. its shape, its texture, etc.) which is used by the interactive software experience to render the experience
  audio snippets or text associated with that module, e.g. to be used in the portrayal of that module's character (or be integrated into the portrayal of the coherent whole object's character)
  specifications of movements associated with that module or character, e.g. for an arm module it may have characteristic arm-swing action(s) while the coherent whole character is walking or running, etc.
  a mini-game which is enabled within the interactive software experience as a result of using the module or a particular combination (e.g. set) of modules or may be enabled when the user reaches a particular point in the interactive software experience (e.g. at a particular score or level), this may be considered to be part of the interactive software experience
  story-line elements from the interactive software experience (e.g. cut-scenes, new missions, etc.), again this may be considered to be part of the interactive software experience
  the entire interactive software experience (e.g. executable files comprising the interactive software experience or part thereof)
Configuration data, such as:
  Manufacture date
  Manufacturer
  Module type
  Compatibility details i.e. specifying which games or other modules this module is allowed to be used in combination with, for example specified using blacklists, whitelists or filters.
  Details of any sets of modules that the module may belong to (e.g. where a set may, for example, be defined as comprising a particular combination of modules to make a particular coherent physical whole object) and which may unlock particular elements of the interactive software experience In examples where interactive software experience data is stored on the modules themselves, this means that an interactive software experience does not need to include (e.g. at time of shipping) details of every single module which can interact with it nor does the interactive software experience require access to an online look-up service for modules (e.g. for modules where the details were not included when the software was shipped).

In examples where the configuration data defines sets of modules, these sets of modules may, for example, be predefined sets of modules which work well together and which when used together unlock particular features of the interactive software experience. Similarly, sets may be defined which do not work well together. The sets may be advertised to the user or visible through module form factors (e.g. all modules that are robot body parts may work together, but modules which are animal body parts may not work with robot body parts) or in other examples, a set may be a particular combination that a user may discover through interaction with the modules. Although the sets are described above as being part of the constant data, in other examples, set data may form part of the variable data (described below), with sets forming over time (e.g. based on which modules a user regularly uses together to form an object).

Examples of variable data include, but are not limited to:
State data
Details of the owner of the module, which may comprise only the current owner or details of the ownership history
Permissions granted by the owner, e.g. permissions for their "friends" using a social network (e.g. Xbox LIVE®) to borrow the module
A price associated with the module, e.g. a "for sale" price that a friend can pay to buy the module (which may be expressed in real currencies or virtual currencies/points systems), or past history of prices/transactions involving that module
Where/when/from whom the module was bought or how it was acquired (e.g. won as a prize in a game competition)—this is variable data as it is not fixed at the point of manufacture, but may be fixed later on.

It will also be appreciated that some of the items listed as constant data may alternatively be variable data and vice versa.

Any state data which is stored in a module may be specific to a particular interactive software experience (e.g. game dependent) or independent of the interactive software experience with which the module is used (e.g. game independent). Examples of state data which is independent of the interactive software experience with which the module is used include:
  a total real world time in use or number of total uses
  recent history of use
  physical state information for the module (e.g. physical failure states such as an indicator that a sensor has failed or a rotating arm cannot rotate, battery levels, etc.)

details of use with other modules (e.g. IDs of other modules that it has been used with, details of sets of modules which have been used together with the module, etc.)

details of the interactive software experiences with which the module has been used details of the devices with which the modules have interacted (e.g. devices executing the interactive software experience) or otherwise sensed, e.g. by sensing their Bluetooth MAC address.

details of where in the world the module has been used, and of other modules that were also present in such locations (and other users that were present)

Examples of state data which is specific to a particular interactive software experience include:

History within the interactive software experience, e.g. a timeline of use, possibly detailed enough to facilitate re-viewing of past events.

Scores or values which are specific to the particular interactive software experience and may, for example, "achievements" unlocked, etc.

Details of use with other modules in the particular interactive software experience (e.g. IDs of other modules that it has been used with, details of sets of modules which have been used together with the module, etc.)

Details of virtual items from/for the interactive software experience (e.g. such that a module's storage acts as a container for these virtual items)

Where the interactive software experience is a game, the history may comprise a history of past fight encounters and/or the scores/values detailed above may, for example, comprise one or more of:

One or more attribute values, e.g. health, speed, durability, etc.

An experience indicator

Details of any powerups or special skills that have been learned/earned/won by the particular module in the game As with other variable data, the state data may be updated by the interactive software experience with which the module is used (e.g. data which is particular to the specific interactive software experience and any independent data may be updated) and/or by a processor within the module itself or within another module in the coherent physical whole object. The state data may be modified based on user actions or outcomes within the interactive software experience (e.g. a module's health/strength may be depleted as a result of losing a battle in a game, and a module's score may be increased as a result of winning a battle or competition in a game). In various examples, modules may transfer state information between them, either when they form part of the same coherent physical whole object or when they form part of different objects which are brought into proximity with each other.

The state data which is stored in modules may be communicated to an interactive software experience, cause a change in the operation of the interactive software experience and be updated as a result of user interaction with the interactive software experience.

When the state data stored in a module is updated, this may cause a perceptible change in the module itself. In various examples the change may be visible to the user, for example, where a module comprises a visual indicator (e.g. one or more LEDs) or display (e.g. LCD or electronic ink), these may be changed based on updated state information, or a module may change color in response to a change in the state data. In other examples, the change may not be visible but may be detectable by the user in another way (e.g. the module may vibrate or its texture may change such that the change may be detected by a user touching the module).

In various examples the connectors within a module may be programmable and controlled based on the state information. Where the attraction between connectors is controllable, a change in the state information may cause a module to be ejected (or otherwise to detach) from the rest of the coherent physical whole object. This is described in more detail below with reference to FIG. 5.

As well as, or instead of, communicating the IDs and/or module data from the coherent physical whole object 100 to the interactive software experience (via the communication module 108), some or all of the module data stored in the modules may be communicated to a remote (or cloud) server. A cloud server may also update any of the variable data stored on the module (e.g. owner information).

In various examples, the remote server may store a plurality of data records, each data record relating to a physical module 106 and comprising the ID of the module, one or more properties of the module and optionally an identifier for the owner or manufacturer of the module. One or more of these fields (e.g. module ID and/or owner ID) may be verified by an authentication service which provides a method of securely verifying properties about a field's value (e.g. that the owner is correct, that the module ID has been issued to the module by a trusted party and is therefore not counterfeit, etc.).

The properties field(s) within a data record may comprise any property of the module to which the record relates (as identified by the module ID). Examples of properties include, but are not limited to: GPS location data for the module (e.g. a "home" location and/or a current location), interoperability data (e.g. which other modules or types of modules the module can interwork with and/or which interactive software experiences the module can be used with), statistics for the module (e.g. length of time in use, etc.), virtual objects associated with the module (e.g. where these objects have been collected within an interactive software experience), permissions associated with the module (e.g. which fields within the data record can be changed and by whom and in various examples the permissions may be dependent upon the use of the object, such as which interactive software experience it is being used with), interactive software experience data (e.g. textures, device-executable instructions for the software experience or a part thereof, etc.), state data (which may be specific to a particular interactive software experience or independent of any interactive software experience) and references to a secondary (or further) database (e.g. which may contain additional information about, for example, the owner of the module, as identified by the owner ID). It will be appreciated that where the properties field comprises sensitive user data, consent may be collected from the user to store and release this data.

Where the coherent physical whole object communicates with a cloud (or other remote) server, the cloud server may store additional module data (e.g. additional state data) to complement that stored on the modules themselves. In such an example, the cloud server may also store a copy of the data stored on the modules themselves, or the data stored on the cloud server may be different to that stored on the modules themselves. For example, the modules may store current state data whilst the cloud server may store historical data. In another example, data from recently used interactive software experiences may be stored on the module and data from less recently used interactive software experiences may be stored on the cloud server.

Figure 2:
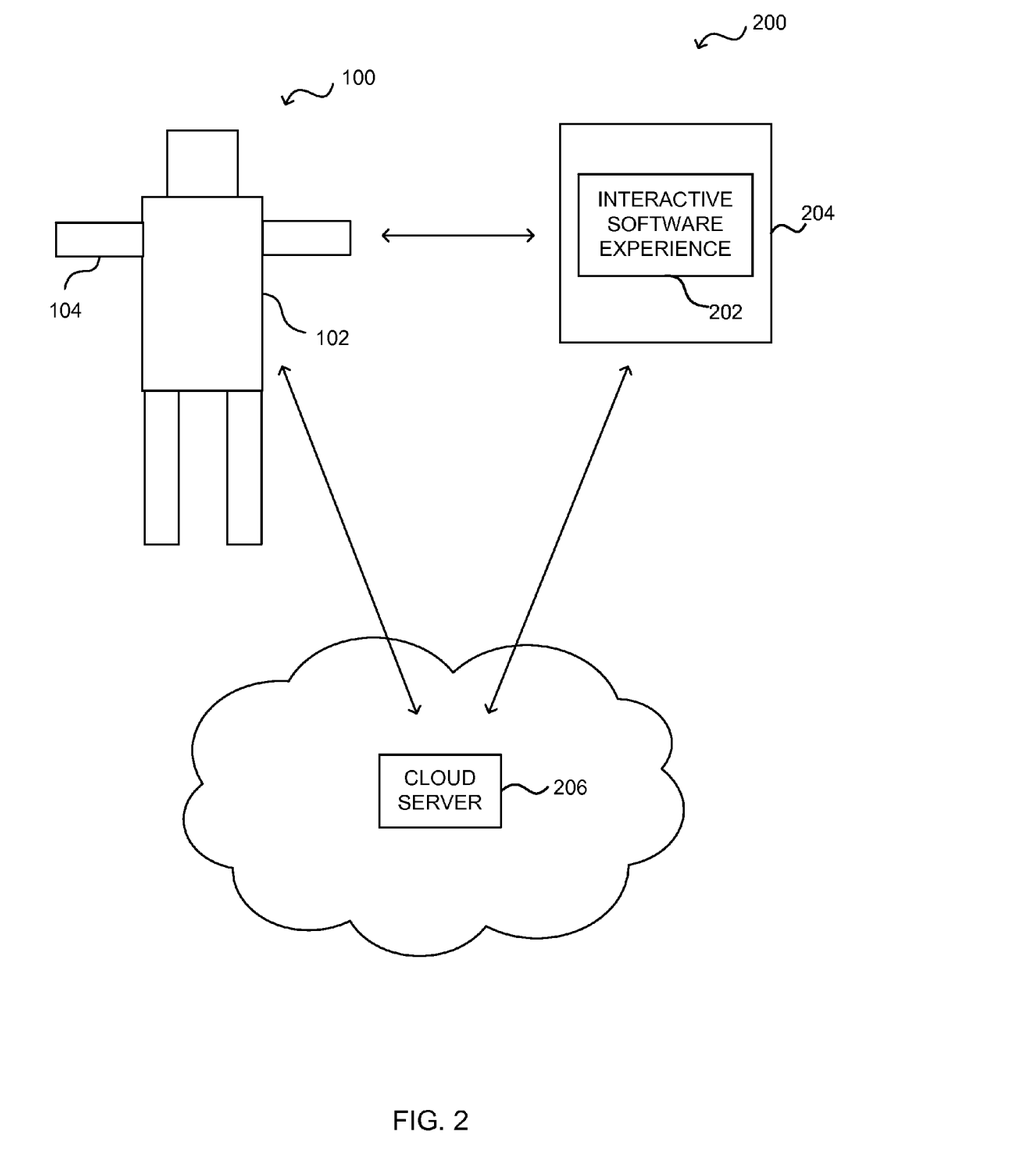
FIG. 2 is a schematic diagram of a system comprising the coherent physical whole object such as shown in FIG. 1.

FIG. 2 is a schematic diagram of a system 200 comprising the coherent physical whole object 100 from FIG. 1. The system 200 further comprises the interactive software experience 202 which runs on a computing-based device 204. The system 200 may further comprise a remote (e.g. cloud-based) server 206. Operation of the system 200 can be described with reference to the example method shown in FIG. 3.

Figure 3:
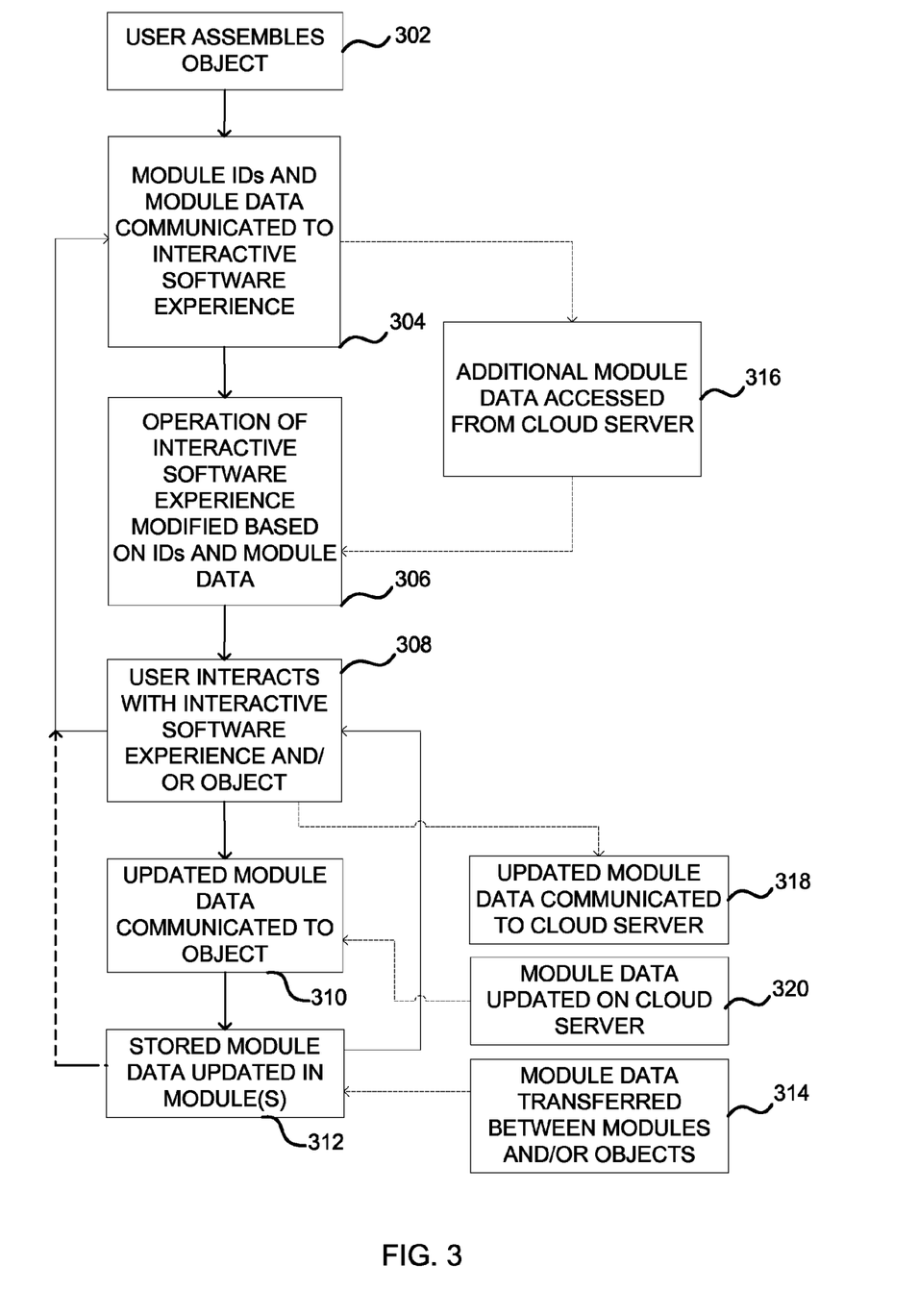
FIG. 3 is a flow diagram showing an example method of operation of the system shown in FIG. 2.

As shown in FIG. 3, the module IDs and some or all of the module data for the modules 102, 104 forming part of the coherent physical whole object 100 are communicated to the interactive software experience 202 (block 304). As described above, each module 102, 104 may communicate their own data (ID and some or all of the module data) to the interactive software experience, or one or more modules may collect data from other modules within the object 100 and transmit the collected data (which may be in raw or aggregated form) to the interactive software experience. In response to receiving this data from the modules, the operation of the interactive software experience is modified based on the received IDs and module data (block 306) and as described above, this modification of the operation may comprise providing a directed interactive experience for the user such that the user needs to interact with the object 100 in order to progress further within the interactive software experience (e.g. to increase the user's score, progress to the next level, complete a task, etc.). Alternatively, the modification (in block 306) may comprise enabling, disabling or modifying functionality within the interactive software experience and/or updating a graphical user interface provided by the interactive software experience.

A user interacts with the object 100 (as part of directed or undirected activity within the interactive software experience 202) and/or the interactive software experience (block 308) and as a consequence of this, updated module data is communicated to (and received by) one or more modules within the object 100 (block 310). In a similar way to the data which is communicated from the object to interactive software experience, the communication may be between the interactive software experience and individual modules within the object or one or more of the modules may act as conduits for the information: receiving information from the interactive software experience and communicating it to the module (within the object) to which the information relates. Irrespective of whether the updated module data is received directly from the interactive software experience or via another module, the received updated module data is stored in the module(s) to which it relates (block 312). For example, the updated module data may only relate to one of the modules within the object and so may only be stored in that module. Further interaction with the interactive software experience 202 and/or object 100 (in block 308) may result in further changes in the module data being communicated to the object (in block 310) and stored in one or more modules (in block 312).

As shown by the arrows in FIG. 3, when a user interacts with the object 100 (in block 308) this may result in the module data stored in one or more modules in the object being updated. In such an example, this updated module data may then be communicated to the interactive software experience (block 304).

In various examples, there may be interaction between objects (or between modules forming parts of different objects) and as a result there may be transfer of module data between modules and/or objects (block 314). Where this occurs, the module data stored in the modules is updated (block 312) and the changes may be communicated to the interactive software experience (block 304).

In various examples, the system 200 may comprise a cloud server 206. As described above, this cloud server 206 may store additional data relating to modules and in which case, the interactive software experience may access additional module data for those modules forming part of the object 100 from the cloud server (block 316). In some examples, as a result of the user interacting with the interactive software experience 202 and/or the object 100, updated module data may be communicated to the cloud server (block 318) and stored by the cloud server.

In various examples, the module data stored by the cloud server for a module may be updated independently of any user interaction with the interactive software experience (block 320), e.g. where the user sells/buys a module and so ownership information changes. In examples where this happens, the updated module data may be communicated from the cloud server to the module(s) to which it relates (block 310) and stored in the module(s) (block 312). The information may be communicated (in block 310) from the cloud server directly to the module(s) or via one or more other entities, such as another module, the interactive software experience 202, the device 204 running the interactive software experience (e.g. using a separate module update application), etc.

Figure 4:
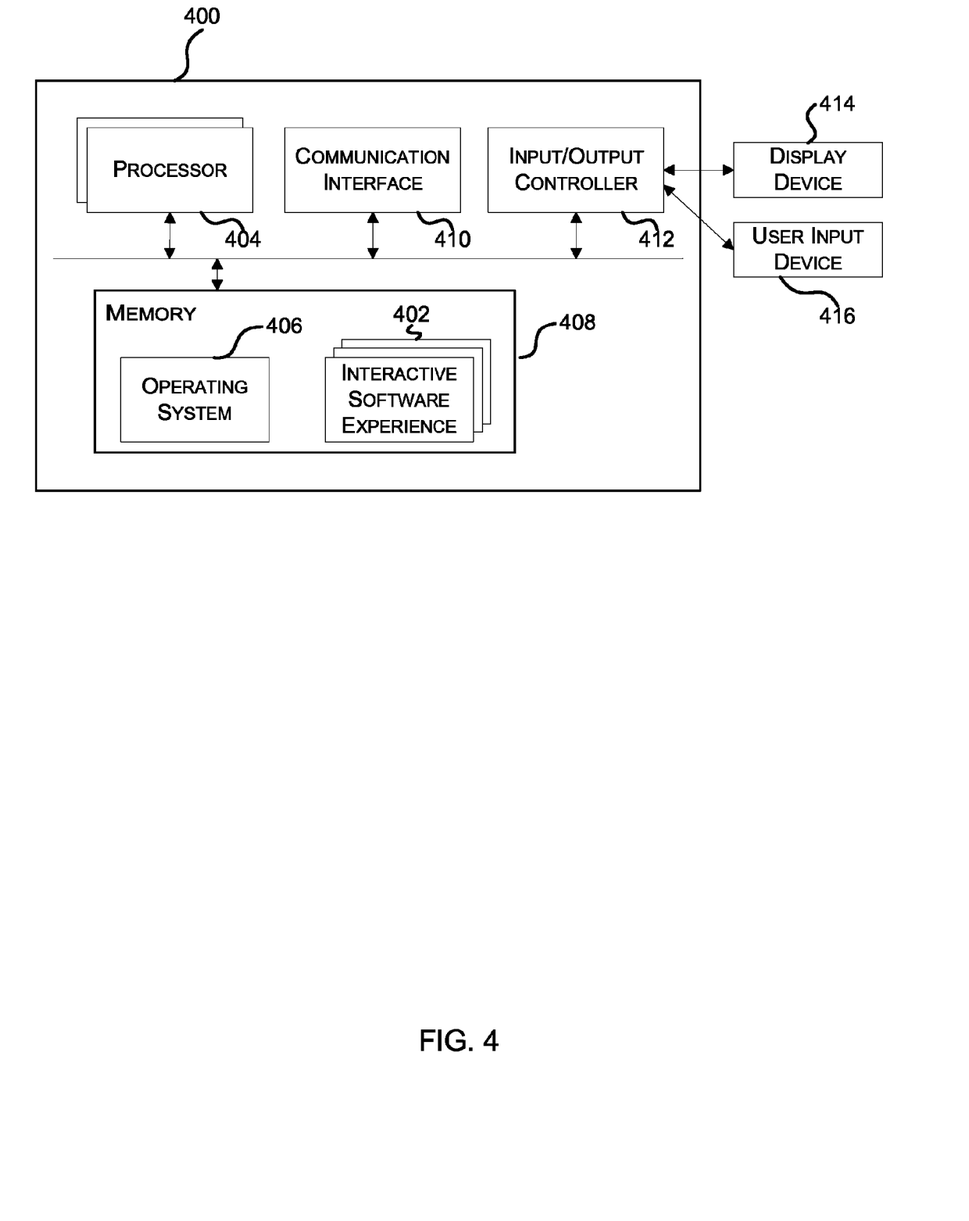
FIG. 4 illustrates an exemplary computing-based device in which embodiments of the methods described herein may be implemented.

FIG. 4 illustrates various components of an exemplary computing-based device 400 which may be implemented as any form of a computing and/or electronic device, and on which the interactive software experience 402 may run. As shown in FIG. 4, the device may run more than one interactive software experience 402 and any object 100 may communicate with one or more interactive software experiences. In some examples, the interactive software experience may be selected by the user and in other examples, the interactive software experience may be determined based on the particular selection of modules assembled into the coherent physical whole 100 by the user. As described above, in various examples, the interactive software experiences may be stored in and uploaded from one or more modules assembled into the coherent physical whole 100 by the user.

Computing-based device 400 comprises one or more processors 404 which may be microprocessors, controllers or any other suitable type of processors for processing computer executable instructions to control the operation of the device in order to run the interactive software experience. In some examples, for example where a system on a chip architecture is used, the processors 404 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 406 or any other suitable platform software may be provided at the computing-based device to enable application software, such as the interactive software experiences 402 to be executed on the device.

The computer executable instructions may be provided using any computer-readable media that is accessible by computing based device 400. Computer-readable media may include, for example, computer storage media such as memory 408 and communications media. Computer storage media, such as memory 408, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 408) is shown within the computing-based device 400 it will be appreciated that the storage may be distributed or located remotely and accessed via a network or other communication link (e.g. using communication interface 410).

The communication interface 410 enables the computing-based device 400 to communicate with modules 102, 104. Where the computing-based device 400 communicates directly with a module 102, 104, the communication interface 410 comprises a wireless interface. In other examples, where the computing-based device 400 communicates with a module via a network or intermediary device, the communication interface may use wired or wireless technology. As described above, the communication interface may communicate with each module within the object 100 or with only a subset (i.e. a proper subset) of the modules.

The computing-based device 400 also comprises an input/output controller 412 arranged to output display information to a display device 414 which may be separate from or integral to the computing-based device 400. The display information may provide a graphical user interface. The input/output controller 412 is also arranged to receive and process input from one or more devices, such as a user input device 416 (e.g. a mouse, keyboard, camera, microphone or other sensor). In some examples the user input device 416 may detect voice input, user gestures or other user actions and may provide a natural user interface (NUI). This user input may be used to control the interactive software experience 402. In various embodiments the display device 414 may also act as the user input device 416 if it is a touch sensitive display device. The input/output controller 412 may also output data to devices other than the display device, e.g. a locally connected printing device (not shown in FIG. 4).

Any of the input/output controller 412, display device 414 and the user input device 416 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 5:
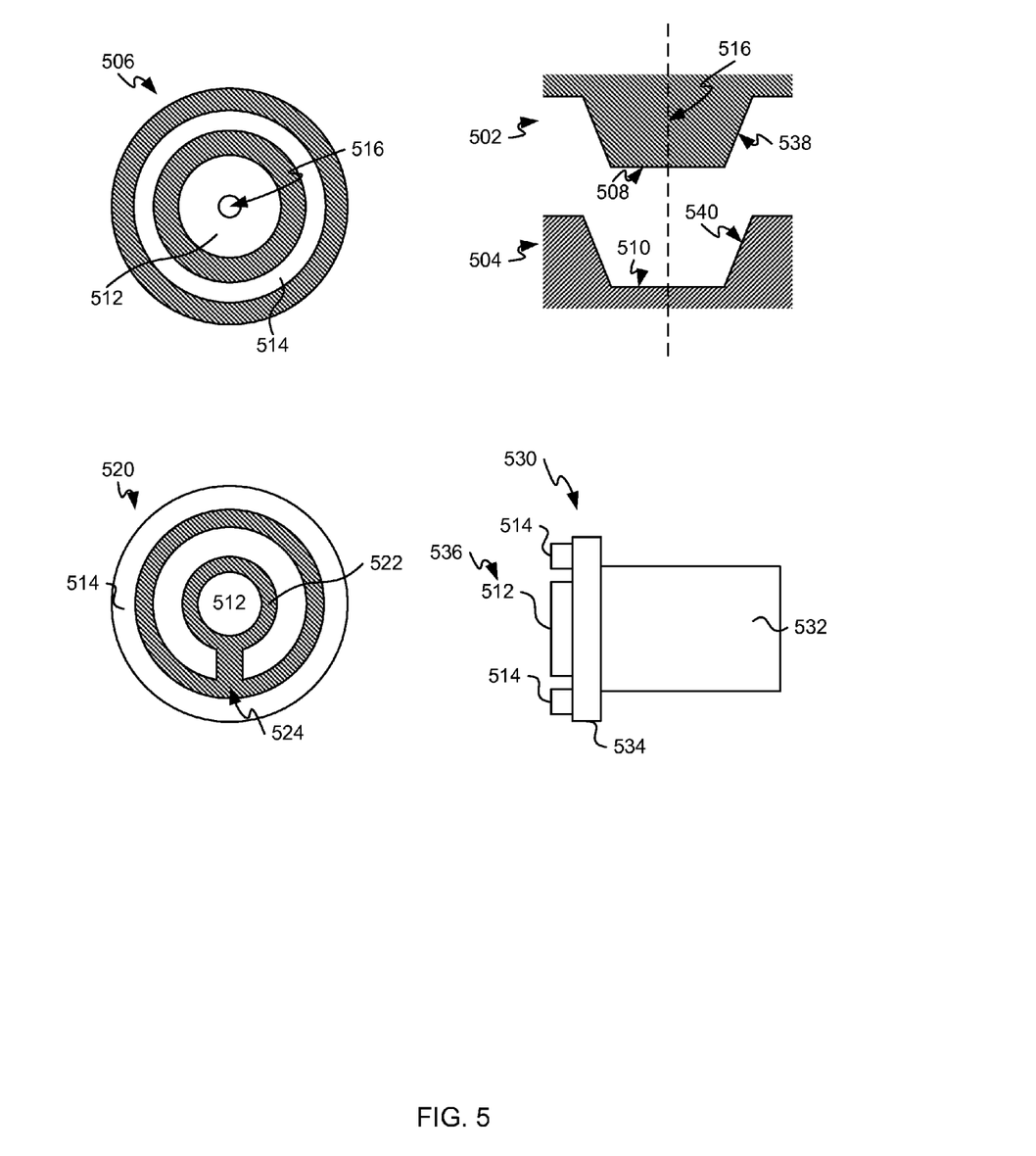
FIG. 5 shows a cross-section through each of a mating pair of example connectors.

FIG. 5 shows a cross-section through each of a mating pair of example connectors 502, 504 which may be used to connect two modules together. As described above, each connector is arranged to pass power and data between modules. A plan view 506 of the contact faces 508, 510 of each of the connectors is also shown and this view is the same for both connectors in the mating pair. It can be seen that the contact face of these connectors are circular and the connectors provide mechanical guiding elements 538, 540 which assist in correctly mating the two connectors (e.g. to make them easier to use). The plan view 506 of the contact faces shows concentric rings of connections and in this example, two separate electrical connections 512, 514 are provided. In other examples there may be only one electrical connection or there may be more than two concentric rings. By using this arrangement, the connectors (and hence the modules) are free to rotate about the central axis 516 of the connectors, although any motion perpendicular to the axis 516 is constrained/prevented by the mechanical guiding elements 538, 540. In various examples, a connector is fixed relative to the module in which it is located, but is free to rotate with respect to another module.

In various examples, the central core (connection 512) may be free to move independently of the outer ring (connection 514). This may be achieved, for example, by forming the central core on a tab or tongue 522 which is only connected to the outer portion in one place 524, thereby forming an articulated arrangement, as shown in the second plan view 520 in FIG. 5.

In order to physically connect the modules together, such that they do not separate when pushed gently or picked up, the connections 512, 514 may be formed from magnetic material, with each of the connectors 502, 504 being of opposite polarity so that the connections in different connectors are attracted to each other and the modules are held together by the magnetic attraction. By appropriate selection of magnets and dimensions, the attractive forces may be sufficient to hold the modules together when picked up by a user, but not so strong that they cannot be separated by the user when they wish to re-arrange the modules. Different strengths of magnets may be used for different applications (e.g. less strong attraction for toys for young children).

In an alternative configuration of magnetic connector, instead of using magnetic material to form the electrical connections, a magnet 532 may be provided behind a PCB 534 (which may be a flexible PCB) providing the contact face 536 (and contacts 512, 514), as shown in the third cross section 530 in FIG. 5. The same construction may be used in both connectors 502, 504 with opposite polarity magnets 532.

Where magnets are used in the connectors to physically hold them together, the magnets (e.g. magnet 532 or the magnets providing connections 512, 514 in the alternative implementation) may be permanent magnets or may be electromagnets. Where electromagnets are used, the magnets may be programmable such that their polarity may be altered under the control of the processor within a module (e.g. based on stored state data). Use of programmable electromagnets enables a processor to control whether a particular module can connect to another module or not. For example, although a module may initially be able to connect (as the electromagnets have opposite polarities) the processor may subsequently change the polarity of one or more of the magnets so that they no longer attract but instead repel each other, forcibly ejecting the module. This may, for example, be used as part of the interactive software experience (e.g. within game play, for example during a battle) and/or to restrict the interoperability of modules. Examples of limiting interoperability include, but are not limited to, limiting which modules can connect to which connections on a core module (e.g. only "head modules" may be allowed to connect to the "head connection" on the core, and where a non-head module is detected, it may be ejected by the processor) and limiting modules to work within particular sets of modules (e.g. robot limbs can only be connected to a robot body and not to, for example, a horse body, or modules associated with a particular game or brand can only be connected to other modules from the same game/brand).

The interoperability of modules may also be restricted using magnetic polarity in examples where permanent magnets are used. For example, a "head" connector on a core module may have a central connector 512 of a first polarity and an outer connector 514 of a second polarity, where the first and second polarities may be the same or different. In contrast, a "limb" connector on a core module may have a central connector 512 of the second polarity and an outer connector 514 of the first polarity. This therefore restricts limb peripheral modules to connecting only to the limb connector on the core module and head peripheral modules to connecting only to the head connector on the core module.

Although FIG. 5 shows arrangements of magnets of either a single polarity on the contact face (magnet 532) or two concentric rings of magnetic material, it will be appreciated that these are provided by way of example and other arrangements may also be used (e.g. more than two concentric rings, or shapes other than rings, where the modules do not need to rotate once connected).

The polarity of magnets may also be exploited for purposes other than (or in addition to) rejecting/ejecting modules. In various examples, the polarity of magnets within the connectors may be used to limit the angle of movement (or angle of attachment) of a module relative to another module. In other examples, the angle of movement/attachment may be limited using physical structures on the connector surfaces.

Although the present examples are described and illustrated herein as being implemented in a gaming system, the system described is provided as an example and not a limitation. As those skilled in the art will appreciate, the present examples are suitable for application in a variety of different types of interactive software experiences/systems.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A modular assembly system for use with an interactive software experience, the system comprising a module and the module comprising:
   one or more connectors for attaching other modules to the module to form a coherent physical whole object, each connector being arranged to pass data and power between modules; and
   a storage element arranged to store an identifier of the module and module data for the module, wherein at least a portion of the module data is updated in use by the interactive software experience in response to user interaction, the module data comprising at least one of permissions, price, or acquisition data of the module.

2. The system according to claim 1, further comprising:
   a communications module arranged to transmit the identifier and some or all of the module data to a computing-based device running the interactive software experience and to receive the updated module data from the interactive software experience.

3. The system according to claim 2, wherein the communications module is further arranged to transmit at least a part of the module data to a module in a proximate object.

4. The system according to claim 1, wherein the at least a portion of the module data comprises state data associated with the interactive software experience.

5. The system according to claim 4, wherein the state data associated with the interactive software experience is updated in use by the interactive software experience in response to user interaction with the interactive software experience.

6. The system according to claim 1, wherein the module data comprises state data which is independent of an interactive software experience.

7. The system according to claim 1, wherein the data passed between modules via the one or more connectors comprises at least one of the identifier and a part of the module data.

8. The system according to claim 1, wherein the module data comprises executable files comprising the interactive software experience or a part of the interactive software experience.

9. The system according to claim 1, wherein the module data comprises a model of the module for use in the interactive software experience.

10. The system according to claim 1, wherein the module data comprises data for use by the software experience in rendering a graphical representation of the coherent physical whole object.

11. The system according to claim 1, further comprising the interactive software experience and wherein the interactive software experience is arranged to change its operation in response to module data received from one or more modules forming the coherent physical whole object.

12. The system according to claim 9, wherein the interactive software experience is a game.

13. The system according to claim 9, wherein the interactive software experience is arranged to provide directed interaction by presenting objectives to a user that can only be achieved by user interaction with one or modules in the object.

14. The system according to claim 1, further comprising a remote server arranged to store additional module data for the module.

15. The system according to claim 1, wherein the module is arranged to exhibit a perceptible physical change in response to a predefined change in the module data.

16. A method of operation of a modular assembly system, the method comprising:
   transmitting an identifier and module data from a module to an interactive software experience, wherein the module comprises one or more connectors for attaching other modules to the module to form a coherent physical whole object, each connector being arranged to pass data and power between modules; and a storage element arranged to store the identifier of the module and the module data;
   transferring at least a part of the module data between the module and a second module forming part of a physically separate proximate coherent physical whole object;
   receiving updated module data from the interactive software experience, the updated module data having been generated based on user interaction with the interactive software experience or the object; and
   storing the updated module data in the storage element in the module.

17. The method according to claim 16, further comprising:
   presenting, within the interactive software experience, one or more user objectives, wherein at least one objective requires a user to interact with the object to achieve the objective.

18. The method according to claim 16, wherein operation of the interactive software experience is changed in response to module data received from one or more modules forming the coherent physical whole object.

19. A modular assembly system comprising a module and the module comprising:
   one or more connectors for attaching other modules to the module to form a coherent physical whole object, each connector being arranged to pass data and power between modules;
   a storage element arranged to store an identifier of the module and module data for the module;
   a communications module arranged to transmit the identifier and module data to a computing-based device running the interactive software experience and to receive updated module data from the interactive software experience, the updated module data being generated in response to user interaction with the interactive software experience; and
   the communications module further arranged to transfer at least a part of the module data between the module and a second module forming part of a physically separate proximate coherent physical whole object.

20. A modular assembly system according to claim 19, wherein at least one of the modules is at least one of a body part, accessory, or component of a playset for a human, animal, or fantasy character.

* * * * *